United States Patent [19]

Schoennahl et al.

[11] Patent Number: 5,925,585
[45] Date of Patent: Jul. 20, 1999

[54] MATERIALS FORMED BY REFRACTORY GRAINS BOUND IN A MATRIX OF ALUMINUM NITRIDE OR SIALON CONTAINING TITANIUM NITRIDE

[75] Inventors: Jacques Paul Raymond Schoennahl, Villeurbanne; Jean-Philippe Marie Bitouzet, Lyons, both of France

[73] Assignee: Savoie Refractaires, Venisseux, France

[21] Appl. No.: 08/836,855

[22] PCT Filed: Nov. 22, 1995

[86] PCT No.: PCT/FR95/01540

§ 371 Date: May 22, 1997

§ 102(e) Date: May 22, 1997

[87] PCT Pub. No.: WO96/15999

PCT Pub. Date: May 30, 1996

[30] Foreign Application Priority Data

Nov. 24, 1994 [FR] France .................................. 94 14107

[51] Int. Cl.[6] ...................... C04B 35/581; C04B 35/599
[52] U.S. Cl. ...................... 501/98.1; 501/98.3; 501/98.4; 501/98.6; 501/96.4; 501/100; 264/647
[58] Field of Search .................... 501/96.4, 98.1, 501/98.4, 92, 100, 98.3, 98.6; 264/647

[56] References Cited

U.S. PATENT DOCUMENTS

| | | | |
|---|---|---|---|
| 3,991,148 | 11/1976 | Lumby et al. . | |
| 4,243,621 | 1/1981 | Mori et al. . | |
| 4,460,528 | 7/1984 | Petrak et al. | 501/98.1 |
| 4,533,646 | 8/1985 | Wang et al. | 501/98.1 |
| 4,578,363 | 3/1986 | Campos-Loriz | 501/98.1 |
| 4,871,698 | 10/1989 | Fishler et al. | 501/98.1 |
| 5,185,300 | 2/1993 | Hoggard et al. . | |
| 5,212,123 | 5/1993 | Schoennahl . | |
| 5,215,947 | 6/1993 | Schoennahl et al. | 501/98.1 |
| 5,350,609 | 9/1994 | Bouchemousse . | |

FOREIGN PATENT DOCUMENTS

| | | |
|---|---|---|
| 0 322 745 | 12/1988 | European Pat. Off. . |
| 0 482 981 | 10/1991 | European Pat. Off. . |
| 0 598 140 | 11/1992 | European Pat. Off. . |
| 92/16472 | 3/1992 | WIPO . |

*Primary Examiner*—Karl Group
*Attorney, Agent, or Firm*—Nikaido Marmelstein Murray & Oram, LLP

[57] ABSTRACT

The invention relates to refractory materials that may be used in iron and steel metallurgy comprising, in % by weight:

A] 32 to 87% of particles and/or grains of at least one refractory material, the melting temperature and thermal dissociation temperature of which are greater than 1700° C.;

B] 7 to 50% of an in situ-formed binding matrix and consisting of a sialon, AlN or one of its polytypes, or a mixture thereof;

C] 2 to 40% of a material based on titanium nitride TiN dispersed in the matrix; and, optionally, D] 0 to 42% of hexagonal boron nitride, amorphous carbon and/or crystallized graphite dispersed in the binding matrix.

17 Claims, No Drawings

MATERIALS FORMED BY REFRACTORY GRAINS BOUND IN A MATRIX OF ALUMINUM NITRIDE OR SIALON CONTAINING TITANIUM NITRIDE

The invention relates to novel refractory materials consisting of grains bound in a matrix of aluminium nitride or of sialon, containing titanium nitride and, optionally, particles of graphite and/or boron nitride which are dispersed within it, as well as to a process for manufacturing them.

There is a need in iron and steel metallurgy, as well as in aluminium metallurgy, for refractory materials of increasing performance and reliability: what is required in fact is to improve, simultaneously, the corrosion resistance, the hot strength and the heat shock resistance.

The main applications in question are:

refractory ceramic components used in devices for shrouding or regulating the feed streams of cast iron or steel. Particular examples of such components are slide-valve shut-off plates, feed-stream shroud tubes, submerged nozzles and stopper rods;

refractory ceramic components used in agitation devices, either of the mechanical or gas-injection kind, in the molten metal;

seating blocks serving as a housing and support for gas-injection devices and for devices for regulating metal feed streams, as well as impact tiles for ladles and tundishes;

internal lining of blast furnaces and, in particular, of the boshes, twyer belt and crucible;

founding accessories, for cast iron, steel and special alloys, such as nozzles, bots and flow-offs.

The wide variety of stresses which these materials experience often results from the equipment being operated in a non-continuous manner: there is the heat shock at start-up and then at the end of a cycle, and during a cycle the refractory components come successfully into contact with molten metal and then molten slag. Finally, between two cycles, the refractory components remaining at a relatively high temperature are subjected to oxidation by the ambient air.

Purely mechanical stresses are always present: thermal shocks and stresses resulting from handling operations, confinement stresses created by a metallic outer jacket and, finally, in the case of stream-regulating systems, stresses associated with the actual function of the refractory components, that is to say shut-off effects and movements.

Finally, it will be noted that in all cases the refractory components in question are subjected to the erosive action of molten metal.

The list of properties desired for these refractory materials therefore comprises the following:

high hot strength in order to withstand either mechanical stresses or the effects of erosion by the flow of metal or slag;

excellent resistance to chemical corrosion by cast irons, steels and special alloys;

good resistance to corrosion by iron- and steel-making slags and cover powders;

properties of not being wetted by the metals, slags and cover powders so as to limit the extent to which they infiltrate into grain boundaries, cracks and pores, but also to reduce the risks of the skins catching as the product cools down;

good resistance to atmospheric oxidation;

excellent heat shock resistance;

the property of not being oxidized by aluminium and by calcium dissolved in some steels;

tribological properties for moving components.

Despite a complex and corrosive environment, the refractory components in question need to be very reliable since any accidental failure may have catastrophic consequences, both for the plant and for the operators.

Materials based on a silicon carbide granulate, bound in a sialon matrix, are widely used as bricks for lining blast furnaces. In this application the material is intended to withstand a continuous flow over its surface of cast iron for more than 10 or 15 years. However, sialon is slightly soluble in iron and therefore a binding matrix has been sought which is more inert with respect to the metal.

Refractory materials are known from EP-A-0,480,831 which are formed by an alumina-based granulate bound in a binder formed from sialon, these materials being used for the manufacture of plates and nozzles of slide-valve shut-off devices for steel-making ladles and tundishes.

The lifetime of these components very rapidly decreases when they are exposed to very corrosive steels, such as ultra-low-carbon steels treated with calcium carbide (CaSi), that is to say those containing a high dissolved calcium content (>50 ppm).

Finally, materials are known from EP-A-0,482,981 and EP-A-0,482,984 which are based on various refractory granulates, respectively bound in an aluminium nitride or sialon matrix and containing dispersed materials of graphite and/or of boron nitride. These materials are useful for manufacturing slide-valve plates, but above all for manufacturing feed-stream shroud tubes, submerged nozzles and stopper rods. The additions of BN and graphite make it possible to achieve the excellent heat shock resistance required by these applications. However, these materials are attacked, in their binding matrix, when they are used for long periods in contact with corrosive steel.

Common to the prior-art materials mentioned is a nitrided binding matrix, obtained by the in situ reactive sintering under nitrogen either of aluminium or of a mixture of aluminium, alumina and silica. These materials therefore have all the characteristics specific to binding matrices obtained by the reactive sintering of metal powder under nitrogen, namely excellent hot strength, low open porosity and, above all, small-diameter pores, guaranteeing low wettability and good resistance to infiltration by molten metals and slag.

The present invention aims to provide novel refractory materials and components based on the same granulates, whose general characteristics are at least equivalent to those of the prior materials and components, in particular the low porosity and the high hot strength, but whose resistance to matrix corrosion by steels is significantly improved, as well as a process for manufacturing these materials.

More particularly, the invention relates to novel refractory materials characterized in that they comprise, in % by weight:

A] 32 to 87% of particles and/or grains of at least one refractory material the melting temperature and thermal dissociation temperature of which are greater than 1700° C., this material being chosen from corundums, mullite, materials of the alumina-zirconia system, magnesia, pure or partially stabilized zirconias, on condition that their particle size is at least 50 $\mu$m, the MgO-Al$_2$O$_3$ spinel, whether these products are electrically fused or sintered, the electrically fused materials having an alumina content of at least 85% by weight and the electrically fused materials of the aluminasilica-zirconia system containing at least 40% of alumina and 5% of zirconia, aluminium oxycarbides of the $Al_4O_4C$ and $Al_2OC$ types, products based on aluminium oxynitride, bauxite, and refractory argillaceous chamottes;

B] 7 to 50% of an in situ-formed binding matrix consisting mostly:

either of a sialon of formula $Si_{6-z}Al_zO_zN_{8-z}$ where z equals 0 to 4, as determined from an X-ray diffraction pattern;

or of aluminium nitride AlN of hexagonal structure and/or of at least one of the AlN polytypes, denoted in the Ramsdell notation by 2H, 8H, 27R, 21R, 12H and 15R, as determined from an X-ray diffraction pattern;

or of a mixture of these constituents;

C] 2 to 40% of a material based on titanium nitride TiN dispersed in the matrix; and, optionally, D] 0 to 42% of hexagonal boron nitride, amorphous carbon, and/or crystallized graphite dispersed in the binding matrix.

The invention also relates to refractory components which are to be exposed to contact with a molten metal, characterized in that they consist of a refractory material comprising, in % by weight:

A] 32 to 87% of particles and/or grains of at least one refractory material, the melting temperature and thermal dissociation temperature of which are greater than 1700° C.;

B] 7 to 50% of an in situ-formed binding matrix consisting mostly:

either of a sialon of formula $Si_{6-z}Al_zO_zN_{8-z}$ where z equals 0 to 4, as determined from an X-ray diffraction pattern;

or of aluminium nitride AlN of hexagonal structure and/or of at least one of the AlN polytypes, denoted in the Ramsdell notation by 2H, 8H, 27R, 21R, 12H and 15R, as determined from an X-ray diffraction pattern;

or of a mixture of these constituents;

C] 2 to 40% of a material based on titanium nitride TiN dispersed in the matrix; and, optionally, D] 0 to 42% of hexagonal boron nitride, amorphous carbon, and/or crystallized graphite dispersed in the binding matrix.

As examples of refractory materials which can constitute the grains or particles [A], mention may be made, in a non-limiting way, of corundums, mullite, materials of the alumina-zirconia system, magnesia, pure or partially stabilized zirconias, on condition that their particle size is at least 50 μm, the $MgO-Al_2O_3$ spinel, whether these products are electrically fused or sintered, the electrically fused materials having an alumina content of at least 85% by weight and the electrically fused materials of the alumina-silica-zirconia system containing at least 40% of alumina and 5% of zirconia, aluminium oxycarbides of the $Al_4O_4C$ and $Al_2OC$ types, products based on aluminium oxynitride, bauxite, and refractory argillaceous chamottes and silicon carbide. The choice of the nature of the grains or particles used will depend on the particular application envisaged; they contribute specifically to the corrosion resistance, the erosion resistance and the abrasion resistance of the material, as well as to its thermal conductivity. They are essentially employed in order to lower the manufacturing cost of the products.

The proportion of grains or particles [A] in the materials and components of the invention may vary widely depending on the properties of the material desired. The proportion of [A] may range from approximately 32 to 87% by weight. Currently a proportion of from approximately 36 to 68% by weight is preferred. The granulate [A] content is usually defined so as to bring the composition up to 100% after the [B], [C] and [D] contents have been fixed.

The particle size of constituent [A] (also called "granulate") may vary widely depending on the nature of the said constituent and the desired properties of the final material or component. The size of the particles or grains of constituent [A] may vary widely, this lying within the range of from 1 μm to 10 mm. Particles smaller than 1 μm are not advantageous as they are too difficult to manufacture or are likely to have undesirable or excessive reactivity. Grains larger than 10 mm are not at all desirable as they give the material a poor appearance and they are not suitable for manufacturing thin components.

The binding phase [B], which binds the grains [A] together, consists mostly of sialon of formula $Si_{6-z}Al_zO_zN_{8-z}$, where z equals from 0 to 4 and preferably from 2.5 to 3.5, or of aluminium nitride AlN or of a polytype of aluminium nitride or of a mixture of these constituents.

The proportion of the binding phase [B] itself may also vary widely. The proportion of binding phase [B] may range from approximately 7 to 50% by weight. The lower band is so-defined because of the need for the material to maintain good properties in terms of porosity and strength and the upper band because of economic reasons which would indicate as much of constituents [A] as possible.

Usually the proportion of binder [B] is chosen depending on the type of the constituent [A] used.

Broadly speaking, three main types of materials may be distinguished:

materials having a coarse granulate [A], that is to say those for which constituent [A] is formed from at least 90% by weight of grains having a diameter lying between 50 μm and 10 mm. These coarse-granulate materials advantageously contain a relatively low proportion of binder [B], for example from 7 to 18% by weight, preferably from 12 to 18%, and are relatively low-cost materials having acceptable porosity and strength properties;

materials having a fine granulate [A], that is to say those for which constituent [A] is formed from at least 90% by weight of particles having a diameter less than 50 μm. These fine-granulate materials advantageously contain a relatively high proportion of binder [B], for example from 30 to 50% by weight, preferably from 30 to 45%, and are materials with excellent mechanical characteristics (very high cold flexural strength) and very good tribological properties due to the high binder content (low coefficient of friction, low degree of abrasion with respect to other ceramics and to metals). In addition, they allow components with very small tolerances to be produced. On the other hand, their manufacturing cost is substantially higher than that of coarse-granulate materials;

materials having a mixed granulate [A], that is to say a granulate formed by a mixture of relatively coarse and relatively fine particles, which have intermediate properties. These materials usually contain an average proportion of binder [B], for example from 15 to 35% by weight.

The binder contents of the abovementioned main types are only given by way of indication and various factors, such as the corrosion resistance or the heat shock resistance specific to the granulate selected, may come into play and lead to compositions lying outside the ranges of proportions recommended for each type.

Constituent [C] may be any material based on titanium nitride. For example, this may be a titanium nitride powder of greater than 99% purity, or a powder of a TiN-TiC solids solution containing at most 30% of TiC, this having the advantage of resulting in good performance characteristics while being less expensive to produce than pure TiN.

The proportion of constituent [C] may vary from 2 to 40%, preferably from 2 to 20%. Currently, it is most particularly preferred to incorporate from 5 to 15% of [C]. Preferably, at least 90% of the particles of constituent [C] are between 1 and 100 μm.

Ingredient [D], optionally dispersed in the binding phase, may consist of boron nitride, amorphous carbon, crystallized graphite or a mixture thereof. The crystallized graphite is preferably in the form of flakes. Ingredient [D] may contribute to improving the heat shock nature of the materials or components and to improving their property of not being wetted by metals and slag, as well as their tribological properties.

The proportion of particles [D] may also vary widely. The proportion of particles [D] may range from 0 to 42% by weight. Currently, a proportion of from approximately 5 to 30% is preferred.

The invention also relates to a process for manufacturing refractory materials according to the invention.

This process is characterized in that:

1. An initial charge is prepared which comprises a mixture of the following constituents in the proportions indicated:
   a) 32 to 90% by weight, preferably from 40 to 75%, of grains and/or particles consisting of a refractory material whose melting temperature and possible thermal dissociation temperature are greater than 1700° C.;
   b) 6 to 42% by weight of a mixture of reactive powders, essentially consisting of:
      1. In the case of a sialon matrix
         (i) 23 to 90%, preferably from 25 to 45%, of silicon powder, at least 90% of the particles of which have a diameter less than 150 μm,
         (ii) 0 to 62%, preferably from 30 to 55%, of calcined alumina, at least 90% of the particles of which have a diameter of less than 20 μm,
         (iii) 0 to 28%, preferably from 11 to 25%, of aluminium powder, at least 90% of the particles of which have a diameter less than 80 μm, the total of constituents (i) to (iii) representing 100% and the ratio of the proportion of aluminium to the proportion of calcined alumina being less than 0.7.
      2. In the case of a binding matrix of aluminium nitride 100% of aluminium powder, at least 90% of the particles of which have a diameter less than 80 μm.
      3. In the case of a binding matrix consisting of one of the polytypes of aluminium nitride
         85 to 25% by weight of silicon and aluminium powders in a maximum Si powder/Al powder ratio of 0.8, these powders being combined with calcined alumina in a proportion of from 15 to 75% by weight. Preferably, a mixture is used which comprises, by weight:
            (i) 10 to 20% of silicon powder, at least 90% of the particles of which have a diameter less than 150 μm;
            (ii) 25 to 65% of calcined alumina powder, at least 90% of the particles of which have a diameter less than 20 μm;
            (iii) 25 to 60% of aluminium powder, at least 90% of the particles of which have a diameter less than 80 μm, the total of constituents (i) to (iii) representing 100%;
   c) 2 to 43% of powder of a material based on titanium nitride, at least 90% of the particles of which preferably have a diameter lying between 1 and 100 μm;
   d) 0 to 44% by weight, preferably 5 to 33%, of particles of hexagonal boron nitride, amorphous carbon particles, crystallized graphite particles or a mixture of these;
   e) 0 to 3% of a dried and ground refractory clay, the total of ingredients (a) to (e) making 100%; and
   f) a small amount of temporary binder;

2. the resulting mixture is given the desired shape by pressing;

3. the so-shaped mixture is dried; and 4. the so-shaped mixture is fired and dried in a nitrogen-based atmosphere at a temperature of from 1300° C. to 1600° C.

In order to obtain the preferred binding matrix of sialon having the indicated formula in which z=2.5 to 3.5, it has been found that it is necessary to use a mixture of reactive powders comprising, by weight, (i) 25–45% of the silicon powder, (ii) 30–55% of the calcined alumina and (iii) 11–25% of the aluminium powder.

The shaping carried out in step 2 may be carried out in a conventional manner by uniaxial or isostatic pressing. The role of the clay (e) is that of a pressing additive which facilitates the shaping operation.

The drying step 3 may be carried out at a moderately high temperature, for example from 100 to 200° C., preferably at about 150° C.

The duration of the firing step 4 may vary widely depending on the size of the article shaped and dried. By way of indication, the temperature hold of from 4 to 10 hours at a temperature of approximately 1300–1600° C. is usually satisfactory. The expression "nitrogen-based atmosphere" means an atmosphere of which the main constituent is nitrogen. Such an atmosphere may contain other gases in minor proportions, such as inert gases (for example argon), hydrogen or carbon monoxide.

It should be noted that there is a difference between the granulate, titanium nitride, graphite and boron nitride contents of the initial mixture and the proportion of the same constituents in the final product, since the firing is accompanied by nitrogen fixation and therefore by an increase in weight.

The grains and/or particles (a) may have a size lying within the range of from 1 μm to 10 mm, as indicated above for constituent [A]. The grains and/or particles (a) may be chosen from the materials defined hereinabove for constituent [A]. However, with regard to particles (a) having a size of less than 50 μm, the use of pure or stabilized zirconium should be avoided since, in this finely divided form and under the firing conditions, zirconium can react with nitrogen to form ZrN which, in service, oxidizes easily and may cause the material to fail.

The grains and/or particles (a) may consist of just one type of refractory material or of a mixture of refractory materials. In particular, it is possible to use a mixture of grains (>50 μm) of a refractory material and of particles (<50 μm) of another refractory material, in respective proportions of 32–90% and 1–25% by weight.

Currently, it is preferred for the grains and/or particles (a) to contain at least a small amount (>1% by weight) of alumina having a particle size less than 50 μm when the binding matrix [B] is aluminium nitride or a polytype of aluminium nitride.

The mixture (b) of reactive powders represents 6–42% by weight of the initial charge. Preferably, 25–38% by weight of mixture (b) is used for preparing a fine-granulate material and 10–15% by weight of the said mixture (b) for preparing a coarse-granulate material.

In the mixture (b), the calcined alumina particles (ii) are particles of reactive alumina which react with the ingredients (i) and (iii) during the step of firing under nitrogen, in order to form the sialon phase or a AlN polytype.

The titanium-nitride-based constituent (c) is preferably substantially pure titanium nitride, but it may also be sufficient to use a powder of a TiN-TiC solid solution containing up to approximately 30% by weight of TiC.

The ingredient (d) may consist of particles of hexagonal BN or of amorphous carbon (for example carbon black) or of graphite particles. These particles may be fine or coarse. The addition of relatively coarse particles or flakes (>40 μm and preferably >100 mm) of graphite is advantageous when it is desired to improve the heat shock resistance of the final material. In contrast, the addition of carbon black (fine particles of C) is advantageous when it is desired to improve the corrosion resistance of the final material.

The temporary binder (f) may consist of any known temporary binder. By way of example, mention may be made of phenolic resins, furfuryl alcohols and polyvinyls, aqueous solutions of dextrin or of carboxymethyl cellulose, or of calcium lignosulphonate. By way of indication, an amount of temporary binder of the order of from approximately 1 to 4% by weight with respect to the total of ingredients (a) to (e), has usually proved to be satisfactory in order to ensure that the material has good green properties without appreciable deterioration of its general properties.

The invention is illustrated, in a non-limiting way, by the following examples. In these examples, 220×110×60 mm test bricks were prepared using a procedure in which the initial constituents were mixed, per 10 kg charge, in a Bonnet mixer, shaped into bricks using a hydraulic press exerting a pressure of 1000 bar, dried at 150° C. and then fired under nitrogen, in an industrial electric furnace, at a temperature of from 1300 to 1600° C. for 4 to 10 hours, depending on the case.

The properties of the materials were determined using the following tests:

Hot flexural strength: measured in air, after accelerated heating in order to limit the effects of oxidation (measurements carried out under argon generally lead to much higher values, but this test is very expensive).

Heat shock resistance: we have expressed this by the loss (in percent, of cold flexural strength measured on 125×25×25 mm bars after the following treatment:

Suddenly putting the room-temperature test specimens into an oven heated to 120° C., holding them there for 30 min and then quenching the test specimens in cold water.

Resistance to corrosion by steel, cast iron and special alloys:

It is measured using the so-called self-crucible method: the crucible consists of a block of the refractory to be studied, having a 110×110×60 mm format. A 24 mm diameter and 40 mm deep hole is drilled into one of the large faces using a diamond drill. A fixed amount of steel (from 30 to 40 g) is put into the crucible thus formed. The crucible is covered with a 110×110×10 mm cover, made of the same material, and then placed in an electric furnace where it is heated in air to a defined temperature and for a defined time.

After cooling, the crucible is sawn vertically in a plane of symmetry and damage to the refractory is observed at the metal/refractory interface. The corroded thickness, with respect to the initial diameter, is also measured.

This test, which is highly corrosive since it is carried out under oxidizing conditions, has however only a relative value. This is why, in each firing, a crucible of a reference product of known in-service behaviour is included. The degree of corrosion is then expressed in the form of an index which is equal to 100 times the wear in mm of the crucible formed by the product being studied divided by the wear in mm of the reference product.

In the examples mentioned hereinbelow, the test conditions were as follows:

Steel: XC38;

Temperature: 1600° C.;

Temperature hold time: 3 h.

In the examples, the following raw materials were used:

Silicon carbide sold by the Péchiney Electrométallurgie company, under the name Arbina Cristallisé. This is a material essentially consisting of the alpha SiC variety and containing on average 98.5% of SiC by chemical analysis.

Electrically fused black corundum corresponding to the following analysis in % by weight: $Al_2O_3$=96%, $TiO_2$=3%, $SiO_2$=0.6%, $Fe_2O_3$=0.2%, CaO+MgO+$Na_2$O+$K_2$O=0.2%.

Commercial calcined fine alumina containing at least 99.5% of $Al_2O_3$, having an average particle size of approximately 5 μm with 90% of the particles lying between 1 and 20 μm.

Tabular alumina sold by the ALCOA company under the name "Tabular Alumina T 60", 95% of the particles of which are smaller than 45 μm. The tabular alumina is a calcined alumina, sintered at high temperature and ground.

Commercial powdered silicon, sold under the name "T140 Silicon" by the Péchiney Electrométallurgie company, at least 90% of the particles of which have a size less than 150 μm.

Commercial powdered aluminium, sold under the name "Aluminium 200 TV" by the Péchiney Electrométallurgie company, at least 90% of the particles of which have a size less than 80 μm.

Natural graphite crystallized in the form of flakes, originating from China or Madagascar, having an ash content of less than 17% by weight and at least 80% of the particles of which have a size greater than 100 μm.

Hexagonal boron nitride, sold under the name HCST-AO5 by the Herman C. Starck company. This nitride is formed by agglomerates having a size of from 1 to 10 mm, consisting of individual laminae having a size of from approximately 0.5 to 1 μm.

Ground clay, sold under the name "DA.40/42" by the Denain Anzin Minéraux company, corresponding to the following chemical analysis, in % by weight: $Al_2O_3$=36%, $SiO_2$=47%, $Fe_2O_3$=1.8%, $TiO_2$=1.8%, CaO+MgO+$Na_2$O+$K_2$O=0.8%, loss on ashing: 12.6%.

Titanium nitride, of T1153 quality, marketed by the CERAC company, this powder containing 99.5% of TiN and the maximum diameter of the grains being less than 50 μm.

Spinel: an electrically fused MgO-$Al_2O_3$ spinel assaying at 69% $Al_2O_3$ and 30% MgO, marketed by the Pechiney company;

sintered magnesia: a magnesia sold under the name Nedmag 99 by the Billiton Refractories company and corresponding to the following specifications: MgO>98%, $SiO_2$<1%, $B_2O_3$<0.05%, with a CaO/$SiO_2$ ratio>2;

Alumina-zirconia: an $Al_2O_3$-$ZrO_2$ fused granular material assaying at 39% $ZrO_2$ and 60% $Al_2O_3$ sold by the Norton company under the name Nz Alundum.

The following non-limiting examples are given for the purpose of illustrating the invention.

EXAMPLE 1

Using the general operating method described hereinabove, 6 specimens A to F formed by grains of corundum with a sialon-TiN binder were prepared, these mixtures differing from each other by the proportion of TiN in the initial charge, as well as in the final product.

Table 1 recapitulates the constituents of the initial charge and their proportions in % by weight and various properties of the materials obtained, with respect to those of the reference composition R1 outside the invention.

It may be seen that the additions of TiN rapidly improve the resistance of the material to corrosion by steel. Above 20% of TiN, however, a degradation of the behaviour in the corrosion test can be observed. This degradation results essentially from the oxidizing character of said test. Additions greater than 20% of TiN are nevertheless interesting for applications in low oxidizing conditions (refer to Example 8).

The hot strength at 1500° C. is maintained at a high level up to 30% of TiN.

EXAMPLE 2

The mixtures R2 and R3, formed by grains of corundum, metal powders intended for the synthesis of the sialon and metallic titanium powder intended for the in situ synthesis of TiN. These examples are outside the invention.

In these tests, the metallic titanium powder had the T1146 quality of greater than 99.5% purity and at least 90% of the particles of which have a diameter of less than 75 µm, this powder being supplied by the CERAC company.

Table 2 recapitulates the constituents of the initial charge and their proportions in % by weight, with respect to composition C which comes within the scope of the invention.

These specimens were prepared using the operating method described hereinabove.

After firing, the specimens R2 and R3 had completely disintegrated.

This test shows that the in situ formation of TiN from metallic titanium powder, whether or not combined with aluminium or silicon metallic powders, is not suitable for producing the refractory materials concerned in the invention.

Production of a compact, low-porosity and mechanically strong binding matrix therefore requires the dispersion of presynthesized titanium nitride powder in an aluminium and/or silicon powder mixture, which powders produce the desired reactive sintering under nitrogen.

EXAMPLE 3

Using the operating method described hereinabove, two specimens G and H, formed by corundum grains were prepared, the binding matrix of which contains titanium nitride and, respectively, AlN and AlN15R. Table 3 recapitulates the constituents of the initial charge, their proportions and various properties of the materials obtained. Specimen C recalls the characteristics of a product having a sialon-TiN binding matrix.

It is apparent that the invention also applies to the AlN and AlN15R reactive binders. These make it possible to increase the flexural strength of the materials appreciably, as well as the resistance to corrosion by steel compared to sialon. However, they are more sensitive to heat shock.

EXAMPLE 4

Using the operating method described hereinabove, 7 specimens referenced B and I to N, formed by corundum grains having a sialon-TiN binder were prepared from an initial charge containing respectively various proportions of graphite flakes.

Table 4 recapitulates the constituents of the initial charge and their proportions in % by weight and various properties of the materials obtained. The specimen R4, given by way of indication, is outside the scope of the invention. It was prepared according to EP-A-0,482,984 and corresponds to a material commonly used today for submerged nozzles.

An appreciable improvement in the heat shock resistance is observed for a graphite content (measured in the final product) greater than 4%.

For the very high graphite content (specimen M), the heat shock resistance is close to that of the alumina-graphite product having a sialon binder R4 of the same graphite content. A spectacular improvement in the resistance to corrosion by steel is observed by the addition of 5% of TiN.

EXAMPLE 5

Using the operating method described hereinabove, the specimen O, formed by corundum grains having a AlN binder containing 8% of boron nitride and 3% of TiN was prepared. Table 5 recapitulates the constituents of the initial charge, their proportions and various properties of the material obtained. Specimen R5, mentioned by way of comparison, is outside the scope of the invention.

An appreciable improvement in the resistance to corrosion by steel is observed for a small addition of TiN.

It may also be observed that the hot strength is maintained up to a high level and that the heat shock resistance is not affected.

EXAMPLE 6

According to the operating method described hereinabove, 4 specimens, formed by various types of grains bound in a binding matrix of sialon containing 8.3% of titanium nitride dispersed within the binding matrix were prepared.

Table 6 summarizes the constituents of the initial charge as well as their proportions and gives the properties of the materials obtained.

The excellent physical properties obtained show that the invention applies to most of the usual refractory granulates.

The basic granulates, of the spinel or magnesia type, are preferred for applications in which corrosion by a basic slag or a cover powder is the predominant stress, or else in the case of special alloys.

The alumina-zirconia granulate is preferred for applications in which heat shock is predominant, such as, for example, in the case of slide-valve shut-off plates.

The SiC granulate is more particularly be used in blast furnaces in which excellent abrasion resistance and high thermal conductivity are desired.

EXAMPLE 7

Using the general operating method described hereinabove, a specimen T, formed by particles of fine tabular alumina (<45 μm), boron nitride, graphite and a sialon-TiN binder, was prepared.

Table 7 recapitulates the constituents of the initial charge and their proportions in weight % and various properties with respect to those of the reference composition R6, outside the invention.

Comparison of the characteristics of T and R6 shows the advantage of adding titanium nitride to the compositions having a fine structure and a high binder content in order to improve their resistance to corrosion by steel.

EXAMPLE 8

Using the general operating method described hereinabove, specimens U to X according to the invention and two specimens R7 and R8 outside the invention were prepared, varying the proportion of TiN. For the corrosion test, crucibles, as described above, have been embedded within a refractory concrete in order to reduce the oxidizing character of the test.

Table 8 recapitulates the constituents of the initial charge and their proportion in % by weight, the properties of the resulting materials and the mineralogical composition of the latter.

It can be seen that, in these less oxidizing conditions, even small additions of TiN improve the resistance to corrosion by steel. On the contrary, an excessive addition (higher than 40%) causes a degradation of the resistance to corrosion by steel as well as of the open porosity.

TABLE 1

|  |  | R1 | A | B | C | D | E | F |
|---|---|---|---|---|---|---|---|---|
| Composition | Black corundum, 2–0.2 mm | 50 | 50 | 50 | 50 | 50 | 50 | 50 |
|  | Black corundum, 0.2–0.05 mm | 35.2 | 35.2 | 32.1 | 29 | 24.8 | 16.5 | 6.2 |
|  | Calcined fine alumina | 6.1 | 4 | 4 | 4 | 4 | 4 | 4 |
|  | Aluminium, 200 TV | 2.2 | 2.2 | 2.2 | 2.2 | 2.2 | 2.2 | 2.2 |
|  | Silicon, T140 | 4.5 | 4.5 | 4.5 | 4.5 | 4.5 | 4.5 | 4.5 |
|  | Titanium nitride | 0 | 2.1 | 5.2 | 8.3 | 12.5 | 20.8 | 31.1 |
|  | Clay, DA 40/42 | 2 | 2 | 2 | 2 | 2 | 2 | 2 |
|  | CMC solution | +3.2 | +3.2 | +3.2 | +3.2 | +3.2 | +3.2 | +3.2 |
| Properties | Density after nitride formation | 3.24 | 3.30 | 3.29 | 3.38 | 3.31 | 3.32 | 3.27 |
|  | Open porosity (%) | 14.6 | 13.5 | 13.9 | 11.7 | 13.3 | 15.4 | 19 |
|  | Flexural strength (MPa) |  |  |  |  |  |  |  |
|  | at 20° C. | 19.2 | 21.6 | 21.6 | 27.7 | 22 | 29.3 | 21.3 |
|  | at 1500° C | 17.5 | 17.4 | 14.3 | 17.5 | 13.5 | 11.5 | 13 |
|  | Heat shock resistance: loss of FS after quenching (%) | −67 | −64 | −63 | −66 | −61 | −69 | −61 |
| Mineralogical composition | TiN (%) | 0 | 2 | 5 | 8 | 12 | 20 | 30 |
|  | Sialon (%) | 14.5 | 14.5 | 14.5 | 14.5 | 14.5 | 14.5 | 14.5 |
| Steel corrosion index |  | 100 | 100 | 68 | 50 | 59 | 120 | 220 |

TABLE 2

|  | R2 | R3 | C |
|---|---|---|---|
| Black corundum, 2–0.2 mm | 50 | 50 | 50 |
| Black corundum, 0.2–0.05 mm | 19.5 | 23.8 | 29 |
| Calcined fine alumina | 7 | 4 | 4 |
| Aluminium, 200 TV | 0 | 7.3 | 2.2 |
| Silicon, T140 | 0 | 5.3 | 4.5 |
| Metal Ti powder | 20.5 | 6.6 | 0 |
| Titanium nitride | 0 | 0 | 8.3 |
| Clay, DA 40/42 | 3 | 3 | 2 |
| CMC solution | +3.7 | +3.7 | +3.2 |
| Density after nitride formation | Products not viable | | 3.38 |
| Flexural strength at 20° C. (MPa) | Disintegration during firing | | 27.7 |

TABLE 3

|  |  | C | G | H |
|---|---|---|---|---|
| Composition type | Nature of the reactive binder | Sialon | AlN | AlN 15R |
|  | Black corundum, 2–0.2 mm | 50 | 50 | 50 |
|  | Black corundum, 0.2–0.05 mm | 29 | 26.5 | 22.5 |
|  | Calcined fine alumina | 4 | — | 9 |
|  | Aluminium, 200 TV | 2.2 | 12 | 5 |
|  | Silicon, T140 | 4.5 | — | 2 |
|  | Titanium nitride | 8.3 | 8.5 | 8.5 |
|  | Clay, DA 40/42 | 2 | 3 | 3 |
|  | CMC solution | +3.2 | +3.2 | +3.2 |
| Properties | Density after nitride formation | 3.30 | 3.24 | 3.23 |
|  | Flexural strength at 20° C. (MPa) | 27.7 | 43.3 | 35 |
|  | Flexural strength at 1500° C. (MPa) | 17.5 | 26 | 21 |
|  | Heat shock resistance (%) | −66 | −85 | −80 |
| Mineralogical composition | TiN (%) | 8 | 8 | 8 |
|  | Sialon (%) | 14.5 | 0 | traces |
|  | AlN (%) | 0 | 17 | 0 |
|  | AlN15R (%) | 0 | traces | 20 |
| Steel corrosion index |  | 50 | 16 | 46 |

TABLE 4

|  | B | I | J | K | L | M | N | R4 |
|---|---|---|---|---|---|---|---|---|
| Black corundum, 2–0.2 mm | 50 | 50 | 50 | 50 | 45 | 40 | 25 | 40 |
| Black corundum, 0.2–0.05 mm | 32.1 | 23.8 | 19.8 | 15.8 | 12.8 | 7.8 | 7.8 | 8 |
| Calcined fine alumina | 4 | 5.8 | 5.8 | 5.8 | 5.8 | 5.8 | 5.8 | 10.8 |
| Aluminium, 200 TV | 2.2 | 3.2 | 3.2 | 3.2 | 3.2 | 3.2 | 3.2 | 3.2 |
| Silicon, T140 | 4.5 | 6 | 6 | 6 | 6 | 6 | 6 | 6 |
| Titanium nitride | 5.2 | 5.2 | 5.2 | 5.2 | 5.2 | 5.2 | 5.2 | 0 |
| Flaked graphite | 0 | 4 | 8 | 12 | 20 | 30 | 45 | 30 |
| Clay, DA 40/42 | 2 | 2 | 2 | 2 | 2 | 2 | 2 | 2 |
| CMC solution | +3.2 | +3.0 | +2.8 | +2.8 | +2.8 | +2.8 | +2.8 | +2.8 |
| Density after nitride formation | 3.29 | 31.9 | 3.14 | 3.10 | 2.98 | 2.57 | 2.50 | 2.55 |
| Flexural strength at 20° C. (MPa) | 21.6 | 20 | 19 | 17 | 15 | 9 | 8 | 8.9 |
| Heat shock resistance | −63 | −60 | −55 | −48 | −39 | −32 | −15 | −36 |
| TiN (%) | 5 | 5 | 5 | 5 | 5 | 5 | 5 | 0 |
| Sialon (%) | 14.5 | 14.5 | 14 | 14 | 13.8 | 14.3 | 14.4 | 14.5 |
| Graphite (%) | 0 | 4 | 7.8 | 11.3 | 18.2 | 27 | 40 | 27 |
| Steel corrosion index | 68 | 69 | 60 | 48 | 36 | 22 | 23 | 90 |

TABLE 5

|  |  | R5 | O |
|---|---|---|---|
| Composition | Black corundum, 2–0.2 mm | 50 | 50 |
|  | Black corundum, 0.2–0.05 mm | 26.5 | 26.5 |
|  | Aluminium, 200 TV | 12 | 9 |
|  | TiN (%) | 0 | 3 |
|  | BN (%) | 8.5 | 8.5 |
|  | Clay, DA 40/42 | 3 | 3 |
|  | CMC solution | +3.2 | +3.2 |
| Physical characteristics | Density after nitride formation | 3.11 | 3.16 |
|  | Flexural strength at 1500° C. (MPa) | 23 | 23.6 |
|  | Heat shock resistance | −61 | −62 |
| Mineralogical components | AlN (%) | 17 | 13 |
|  | TiN (%) | 0 | 3 |
|  | BN (%) | 8 | 8 |
| Steel corrosion index |  | 90 | 70 |

TABLE 7

|  | R6 | T |
|---|---|---|
| Tabular alumina - 325 mesh | 48 | 35.5 |
| Calcined fine alumina | 14.3 | 14.3 |
| Silicon, T140 | 16 | 16 |
| Aluminium, 200 TV | 7.7 | 7.7 |
| Titanium nitride | 0 | 12.5 |
| Boron nitride | 6 | 6 |
| Flaked graphite | 6 | 6 |
| Clay, DA 40/42 | 2 | 2 |
| CMC solution | +3.0 | +3.4 |
| Density after nitride formation | 2.80 | 2.85 |
| Flexural strength at 20° C. (MPa) | 50 | 53 |
| Steel corrosion index | 100 | 80 |

TABLE 6

| Specimen | C | P | Q | R | S |
|---|---|---|---|---|---|
| Grain type (2 mm to 0.05 mm) % | Black corundum 79 | MgO/Al$_2$O$_3$ spinel 79 | Sintered magnesia 75 | Alumina-zirconia 79 | SiC 75 |
| Calcined fine alumina | 4 | 4 | 8 | 4 | 8 |
| Silica, T140 | 4.5 | 4.5 | 4.5 | 4.5 | 4.5 |
| Aluminium, 200 TV | 2.2 | 2.2 | 2.2 | 2.2 | 2.2 |
| Titanium nitride | 8.3 | 8.3 | 8.3 | 8.3 | 8.3 |
| Clay, DA 40/42 | 2 | 2 | 2 | 2 | 2 |
| CMC solution | +3.2 | +3.2 | +3.2 | +3.2 | +3.0 |
| Apparent density | 3.38 | 3.12 | 3.09 | 3.42 | 2.86 |
| Open porosity % | 11.7 | 12.1 | 15.3 | 12.4 | 12.8 |
| Flexural strength at 20° C. (MPa) | 27.7 | 25 | 22 | 26.3 | 45 |
| Flexural strength at 1500° C. (MPa) | 17.5 | 12.2 | 9.8 | 24.6 | 40 |
| Heat shock resistance (%) | −66 | −70 | −72 | −50 | −75 |

TABLE 8

|  |  | R7 | U | G | V | W | X | R8 |
|---|---|---|---|---|---|---|---|---|
| Composition | Black corundum, 2–0.2 mm | 50 | 50 | 50 | 50 | 50 | 42.5 | 31.9 |
|  | Black corundum, 0.2–0.05 mm | 35 | 31.8 | 26.5 | 19.1 | 8.4 | 0 | 0 |
|  | Aluminium, 200 TV | 12 | 12 | 12 | 12 | 12 | 12 | 12 |
|  | Titanium nitride | 0 | 3.2 | 8.5 | 15.9 | 26.6 | 42.5 | 53.1 |
|  | Clay, DA 40/42 | 3 | 3 | 3 | 3 | 3 | 3 | 3 |
|  | CMC solution | +3.2 | +3.2 | +3.2 | +3.2 | +3.2 | +3.2 | +3.2 |
| Properties | Density after nitride formation | 3.13 | 3.19 | 3.24 | 3.24 | 3.16 | 3.17 | 3.20 |
|  | Open porosity (%) | 15.4 | 13.9 | 12.6 | 11.6 | 14 | 15 | 18 |
|  | Flexural strength at 20° C. (MPa) | 49.4 | 44.2 | 43.3 | 40.2 | 32 | 30 | 20 |
|  | Heat shock resistance, loss of FS after quenching (%) | −92 | −88 | −85 | −80 | −78 | −75 | −68 |
| Mineralogical composition | TiN (%) | 0 | 3 | 8 | 15 | 25 | 40 | 50 |
|  | AlN (%) | 17 | 17 | 17 | 17 | 17 | 17 | 17 |
|  | AlN 15R (%) | Traces | Traces | Traces | Traces | Traces | Traces | Traces |
| Steel corrosion index |  | 100 | 47 | 21 | 80 | 87 | 93 | 120 |

We claim:

1. A refractory material which comprises, in % by weight:
    A) 32 to 87% of particles and/or grains of at least one refractory material having a melting temperature and a thermal dissociation temperature greater than 1700° C., selected from groups 1–4, 1) a material selected from the group consisting of electrically fused or sintered corundums, mullite, alumina-zirconia system materials, magnesia, MgO-Al$_2$O$_3$ spinel, and pure or partially stabilized zirconias having a particle size of at least 50 μm; 2) electrically fused materials having an alumina content of at least 85% by weight and electrically fused alumina-silica-zirconia system materials containing at least 40% of alumina and 5% of zirconia; 3) aluminum oxycarbides of the formula Al$_4$O$_4$C and Al$_2$OC, aluminum oxynitride-based materials, bauxite, and 4) refractory argillaceous chamottes;
    B) 7 to 50% of an in situ-formed binding matrix consisting essentially of: either (i) a sialon of formula Si$_{6-z}$Al$_z$O$_z$N$_{8-z}$ where z is an amount greater than 0 to 4, as determined from an X-ray diffraction pattern; or (ii) aluminum nitride AlN of hexagonal structure and/or of at least one of the AlN polytypes, denoted in the Ramsdell notation by 2H, 8H, 27R, 21R, 12H and 15R, as determined from an X-ray diffraction pattern; or of a mixture of (i) and (ii);
    C) 2 to 40% of titanium nitride dispersed in the matrix; and
    D) 0 to 42% of at least one of hexagonal boron nitride, amorphous carbon and crystallized graphite dispersed in the binding matrix.

2. A refractory material according to claim 1, wherein A) comprises 36 to 68% of the weight of the material.

3. A refractory material according to claim 1, wherein constituent A) has a particle size of between 1 μm and 10 mm.

4. A refractory material according to claim 1, wherein constituent C) comprises from 5 to 15% of the weight of the material.

5. A refractory material according to claim 1, wherein constituent A) is formed in a proportion of at least 90% by weight by grains having a diameter between 50 μm and 10 mm, and which contains from 12 to 18% of binding matrix B).

6. A refractory material according to claim 1, wherein constituent A) is at least 90% by weight by particles having a diameter less than 50 μm, and which contains from 30 to 45% of binder B).

7. A refractory material according to claim 1, which contains from 5 to 30% by weight of constituent D).

8. A process for manufacturing a refractory material, comprising:
    preparing an initial charge comprised of a mixture of the following constituents in the proportions indicated:
    a) 32 to 90% by weight of grains and/or particles consisting of a refractory material have a melting temperature and possible thermal dissociation temperature greater than 1700° C.;
    b) 6 to 42% by weight of a mixture of reactive powders, consisting essentially of either:
        a sialon matrix forming mixture of
            (i) 23 to 90% of silicon powder, at least 90% of particles of which have a diameter less than 150 μm,
            (ii) 0 to 62% of calcined alumina, at least 90% of the particles of which have a diameter of less than 20 μm,
            (iii) 11 to 28% of aluminum powder, at least 90% of the particles of which have a diameter less than 80 μm, the total of constituents (ii) to (iii) representing 10% and the total of the constituents (i) to (iii) representing 100% and the ratio of the proportion of aluminum to the proportion of calcined alumina being less than 0.7; or
        an aluminum nitride matrix precursor consisting of 100% of aluminum powder, at least 90% of the particles of which have a diameter less than 80 μm; or
        aluminum nitride polytype forming mixture of 85 to 25% by weight of silicon and aluminum powders in a maximum Si powder/Al powder ratio of 0.8, said powders being combined with calcined alumina in a proportion from 15 to 75% by weight;
    c) 2 to 4.3% of powder of a titanium nitride-based materials;
    d) 0 to 44% by weight of particles of at least one of hexagonal boron nitride, amorphous carbon particles and crystallized graphite particles; and
    e) 0 to 3% of a dried and ground refractory clay, the total of ingredients a) to e) making 100%;

pressing the mixture to a shape;

drying the resultant shaped mixture; and firing and drying said shaped mixture in a nitrogen-based atmosphere at a temperature of from 1300° C. to 1600° C.

9. The process according to claim 8, wherein ingredient a) represents 40–75%; ingredient b) represents 25–38% when a) is formed by particles of which at least 90% are less than 50 μm and 10–15% when a) is formed by grains of which at least 90% are greater than 50 μm; and ingredient d) represents 5–33%.

10. A refractory component which consists essentially of a refractory material comprising, in % by weight:

A) 32 to 87% of particles and/or grains of at least one refractory material, the melting temperature and thermal dissociation temperature of which are greater than 1700° C.;

B) 7 to 50% of an in situ-formed binding matrix comprising:

either 1) a $Si_{6-z}Al_zO_zN_{8-z}$ wherein z is an amount greater than 0 to 4, as determined from an X-ray diffraction pattern; or (ii) of aluminum nitride AlN of hexagonal structure and/or of at least one of AlN denoted in the Ramsdell notation by 2H, 8H, 27R, 21R, 12H and 1 SR, as determined from an X-ray diffraction pattern; or a mixture of (i) and (ii);

C) 2 to 40% of a material based on titanium nitride dispersed in the matrix; and D) 0 to 42% of at least one of hexagonal boron nitride, amorphous carbon, and/or crystallized graphite dispersed in the binding matrix.

11. The refractory component according to claim 10, wherein constituent A) is selected from the group consisting of electrically fused or sintered corundums, mullite, alumina-zirconia system materials, magnesia, $MgO$-$Al_2O_3$ spinel, and pure or partially stabilized zirconias, having a particle size of at least 50 μm; electrically fused materials having an alumina content of at least 85% by weight and electrically fused alumina-silica-zirconia system materials containing at least 40% of alumina and 5% of zirconia; aluminum oxycarbides of the formula $Al_4O_4C$ and $Al_4O_4C$, aluminum oxynitride-based materials, bauxite, refractory argillaceous chamottes and silicon carbide.

12. The refractory component according to claim 10, wherein A) comprises 36 to 68% of the weight of the material.

13. The refractory component according to claim 10, wherein constituent A) has a particle size of between 1 μm and 10 mm.

14. The refractory component according to claim 10, wherein constituent C) constitutes from 5 to 15% of the weight of the material.

15. The refractory component according to claim 10, wherein constituent A) is formed in a proportion of at least 90% by weight by grains having a diameter between 50 μm and 10 mm, and which contains from 12 to 18% of binding matrix B).

16. The refractory component according to claim 10, wherein constituent A) is formed in a proportion of at least 90% by weight by particles having a diameter less than 50 μm, and which it contains from 30 to 45% of binding matrix B).

17. The refractory component according to claim 10, which contains from 5 to 30% by weight of constituent D).

* * * * *

UNITED STATES PATENT AND TRADEMARK OFFICE
CERTIFICATE OF CORRECTION

PATENT NO. : 5,925,585

DATED : July 20, 1999

INVENTOR(S) : Jacques Paul Raymond Schoennahl, et al.

It is certified that error appears in the above-identified patent and that said Letters Patent is hereby corrected as shown below:

Column 17, line 24, after "AlN" insert --polytypes--.

Signed and Sealed this

Second Day of November, 1999

Attest:

Attesting Officer

Q. TODD DICKINSON

Acting Commissioner of Patents and Trademarks